United States Patent [19]
Schantz

[11] 3,824,329
[45] July 16, 1974

[54] HOUSING FOR ELECTRICAL DEVICE HAVING CONDUCTOR OPENINGS WITH STRAIN RELIEF

[76] Inventor: Spencer C. Schantz, 16608 W. Rogers Dr., New Berlin, Wis. 53151

[22] Filed: Nov. 15, 1972

[21] Appl. No.: 306,638

[52] U.S. Cl. ............................... 174/65 R, 335/202
[51] Int. Cl. .............................................. H05k 5/02
[58] Field of Search........... 174/65 R; 335/202, 278; 200/168 B

[56] References Cited
UNITED STATES PATENTS

| | | | |
|---|---|---|---|
| 1,822,128 | 9/1931 | Clayton | 174/65 R |
| 3,299,201 | 1/1967 | Koke | 174/65 R |
| 3,600,008 | 8/1971 | Barry | 174/65 R |
| 3,670,094 | 6/1972 | Mattson | 174/65 R |

*Primary Examiner*—J. V. Truhe
*Assistant Examiner*—David A. Tone
*Attorney, Agent, or Firm*—Arthur L. Morsell, Jr.

[57] ABSTRACT

Two relays and a push-to-start switch are mounted together on a common frame within a common housing. The cores and coils for the devices are mounted in spaced parallel relationship on the frame. Three legs which extend from one side of the frame are supported adjacent an edge of an insulated terminal strip which latter supports the terminals, contacts, and contact arms for the devices. Two legs which extend at right angles to the first-mentioned legs and which are bent from spaces therebetween are received by slots in a base plate which is also slotted to receive portions of the terminal strip and the frame to support the same. Recesses are formed in the housing member adjacent to the base plate to allow insulated conductors to enter the housing. The recesses contain teeth that bite into the insulation over the conductors to prevent them from being moved longitudinally.

5 Claims, 11 Drawing Figures

PATENTED JUL 16 1974 3,824,329

PATENTED JUL 16 1974　3,824,329

HOUSING FOR ELECTRICAL DEVICE HAVING CONDUCTOR OPENINGS WITH STRAIN RELIEF

BACKGROUND OF THE INVENTION

This invention relates in general to electromagnetic devices such as relays and push-to-start switches, and in particular to electromagnetic assemblies which include a plurality of such devices. Many problems are encountered in the design and fabrication of such electromagnetic assemblies. One problem relates to the design of the common frame and its relationship to the housing, base plate, and terminal strip. Another problem relates to the design of the relay armature with particular reference to providing adjustability both in the "rest" position and in the "actuated" position to compensate for manufacturing tolerances. An additional problem relates to strain relief for the conductors which extend from terminals inside the housing to a plug outside the housing. Further problems relate to the means for fastening the base plate to the housing and terminal strip and for holding the terminal strip in properly-spaced relation with respect to the armatures of the relays and the push-to-start switch.

SUMMARY OF THE INVENTION

In accordance with this invention, the above-noted problems are solved by providing an electromagnetic assembly in which a first plurality of legs extends from the frame to the terminal strip, and a second plurality of legs extends at right angles to the first plurality of legs from the frame to the base plate. The terminal strip and base plate are both slotted to receive their particular legs and hold them in position. A housing member fits over the frame and is slotted to receive the edges of the terminal strip and the first plurality of legs. An important feature of the invention resides in the fact that when the second legs are staked to the base plate the first legs are elastically deformed upwardly to absorb tolerances between the frame, base plate and the terminal strip.

The invention also includes an improved fastening system for securing the cover to the base plate, there being means for preventing displacement of the cover walls during clamping.

The coils and their corresponding cores are mounted in spaced relationship along the frame. The contacts, movable contact arms, and terminals are mounted on the terminal strip facing the coils. The movable contact arms are positioned in mutually overlapping relationship lengthwise of each other to reduce the amount of space required between the coils. The armatures are pivoted transversely of the coils and have fingers projecting therefrom to engage the movable contact arms to open and close the contacts. The fingers are bendable to compensate for manufacturing tolerances. Additional bendable fingers project from the relay armatures for abutting the frame to adjustably limit the movement of the armature away from the coils.

Recesses are provided in the edge of the housing member adjacent to the base plate to allow insulated conductors to enter the housing. The recesses contain teeth which bite into the insulation over the conductors to prevent them from being moved longitudinally.

BRIEF DESCRIPTION OF THE DRAWINGS

FIG. 4 is a top view of the embodiment shown in FIGS. 1 and 2 with portions thereof broken away;

FIG. 5 is a rear view of the embodiment shown in FIGS. 1-4 with portions thereof broken away;

FIG. 6 is a cross-sectional view taken along the line 6—6 of FIG. 5;

FIG. 7 is an enlarged fragmentary detail view showing the recesses through which conductors enter the housing;

FIG. 8 is an enlarged fragmentary detail cross-sectional view taken on the line 8—8 of FIG. 7;

FIG. 9 is an enlarged fragmentary detail cross-sectional view taken on the line 9—9 of FIG. 7;

DETAILED DESCRIPTION OF THE INVENTION

Figure 1:
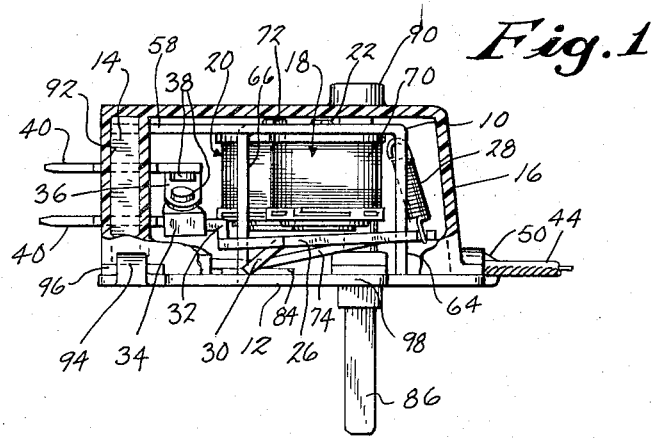
FIG. 1 is an end view of one illustrative embodiment of the invention with portions thereof being broken away.
Figure 3:
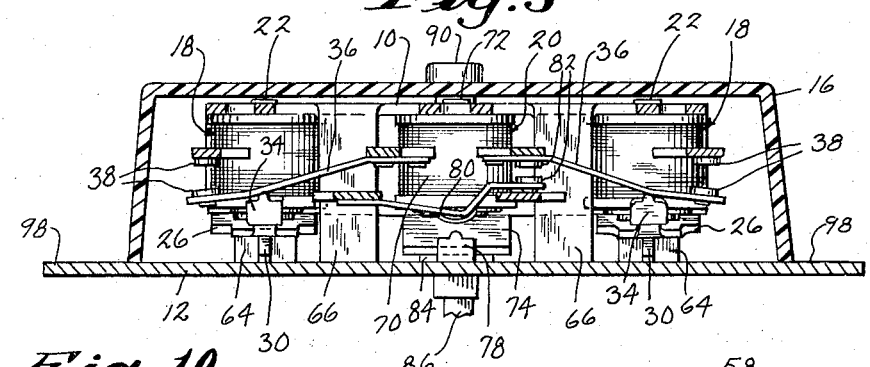
FIG. 3 is a longitudinal sectional view taken on the line 3—3 of FIG. 4.

Referring to the figures, the major parts of one illustrative embodiment of the invention include a ferromagnetic frame 10, a ferromagnetic base plate 12, a terminal strip 14 of insulating material such as plastic, a housing member 16 of plastic insulating material, two relay assemblies 18, and a push-to-start switch 20. Although the base plate 12 is shown in the lowermost position of the drawings for convenience of illustration, it should be understood that the base plate 12 might also be in the uppermost position or in either of the side positions in practice. Referring to FIGS. 1 and 3, the relays 18 and push-to-start switch 20 are mounted upon the frame 10 and on the terminal strip 14 is spaced relationship therealong. The relays 18 are identical in structure and function, and therefore only one of them will be described, it being understood that the description applies to the other relay 18 as well.

The relay 18 contains a ferromagnetic core 22, which is staked at one end to the ferromagnetic frame 10, and a coil 24 which is wound around the core 22. An armature 26 is pivoted on the frame 10 opposite one end of the coil 24 for movement toward and away from the end of the core 22. The armature 26 is normally spring biased away from the end of core 22 and coil 24 by means of spring 28 which is attached between the frame 10 and one end of the armature 26.

Figure 10:
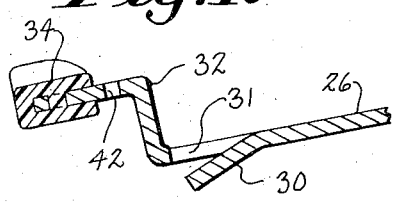
FIG. 10 is an enlarged longitudinal sectional view through an armature for one of the relays.

The movement of the armature 26 away from the coil 24 is limited by means of a bendable finger 30 which projects at an angle from the bottom of the armature 26 and abuts against the base plate 12 when the relay 18 is in its de-energized state. The bendable finger 30 is stamped out of the armature 26 intermediate its width, leaving an opening 31 (see FIG. 10). The bendable finger 30 is a particularly important feature of this invention because it provides an easy adjustment to compensate for manufacturing tolerances in the device. When the device is being assembled, the bendable finger 30 can be easily bent to bring the rest position of the armature 26 precisely to its desired point so that the relay 18 will pull in with the desired amount of current flow through the coil 24.

A second bendable finger 32 projects from the armature 26 and has an insulated tip 34 fitted thereon for contacting a resilient movable contact arm 36 for moving the same to open and close contacts 38. One of the contacts 38 is connected directly to a terminal 40, and the other is connected through contact arm 36 to a terminal 40. The terminals 40 extend through slots in the terminal strip 14 and are staked in place from the outside. The second bendable finger 32 has a hole 42 drilled in it (see FIG. 10) to enhance its bendability, and it projects from the end of armature 26 adjacent to the end of opening 31. The bendable finger 32 is another important feature of this invention because it provides adjustability for the closure of the contacts 38. When the device is being assembled, the bendable finger 32 can be easily adjusted to insure that the contacts 38 will close and will have the proper contact pressure when the relay 18 is energized.

The bendability of the projecting fingers 30 and 32 derives from the fact that they are formed as an integral part of the armature 26, which is made of a relatively bendable ferromagnetic material such as soft steel or the like. The bendability of fingers 30 and 32 is enhanced by the fact that they are relatively slender and, in case of finger 32, by the opening 42 therein.

The relays 18 are energized through insulated conductors 44 which enter housing member 16 through recesses 46 therein (see FIG. 7) and are soldered to opposite ends of the coils 24. The recesses 46 are adjacent to the base plate 12, which serves as one housing member, and are shaped to snugly fit around the conductors 44. Teeth 48 (see FIG. 9) project into the recesses 46 and bite into the insulation around conductors 44 to prevent them from being moved longitudinally in the recess 46. This relieves any strain placed on the conductors 44 from outside of the housing 16, and prevents the strain from being communicated to the terminals to which the conductors 44 are soldered. The teeth 48 are long enough to make a substantial indentation in the insulation of conductors 44 but not long enough to break through the insulation.

The pressure which sinks the teeth 48 into the insulation of conductors 44 is derived from a bendable tab 50 (see FIGS. 7 and 8) which extends from base plate 12 and is bent up and around flange 52 along the edge of housing 16 between the two recesses 46. Preferably, a boss 54 projects from the bottom of flange 52 and fits into an alignment hole 56 in base plate 12. After the conductors 44 are centered in recesses 46, and after the bosses 54 have been inserted into alignment holes 56, the tabs 50 are bent up and around flange 52 to secure the housing member 16 to the base plate 12 and also to cause the teeth 48 to sink into the insulation of conductors 44. The bosses 54 prevent displacement such as side thrust during the bending of the tabs 50 into the clamping position of FIG. 8.

Another important feature of this invention is the configuration of the frame 10 and its relationship to the base plate 12 and terminal strip 14. Referring to FIG. 4, three legs 58 extend from frame 10 to the top edge of terminal strip 14 and engage square bosses 60 which fit into square openings 62 in the legs 58. The legs 58 act as a means of securing the frame 10 to the terminal strip 14 and also as a means of accurately spacing the terminal strip 14 with respect to the armatures 26.

Figure 11:
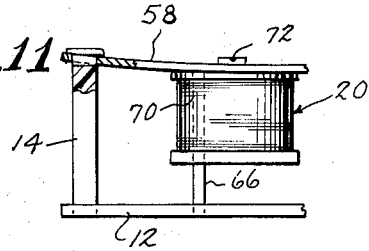
FIG. 11 is a view illustrating how the spaced fingers of the frame are elastically deformed during assembly.

The frame 10 is secured to the base plate 12 by means of three legs 64 (see FIG. 5) which extend downwardly from the rear of frame 10, and by two legs 66 which extend downwardly (as viewed in FIG. 5) from the front of frame 10. The two legs 66 project at right angles to the three legs 58 from spaces therebetween and are formed from metal created by the spaces. The legs 64 and 66 are notched on each side at their lower ends and fit into slots 68 in base plate 12 and are staked in place from the bottom by displacing the metal adjacent the notches. The slots 68 serve to hold the frame 10 and base plate 12 in their proper relative position. The legs 58 are originally straight before assembly. During assembly, when the legs 66 are staked in place to the base plate, the legs 58 are elastically deformed, causing the ends to bend upwardly slightly as shown in FIG. 11. This absorbs tolerances between the frame 10, base plate 12, and terminal strip 14.

FIG. 6 is a cross-sectional view of the push-to-start switch 20. This switch has a coil 70 which is wound around a ferromagnetic core 72, the latter being staked at one end to frame 10. An armature 74 is pivoted to frame 10 for movement toward and away from the lower end of core 72. The armature 74 is normally spring biased away from the end of core 72 by a spring 76 which is attached between the frame 10 and the end of armature 74. An insulated tip 78 is attached to the end of armature 74 to engage a movable resilient contact arm 80 (see FIG. 3) which carries an electrical contact 82. A second electrical contact 82 is mounted opposite the first contact 82 on one of the terminals 40.

Another important feature of the invention is that the movable contact arms 36 and 80 are positioned in mutually overlapping relationship lengthwise of one another as shown in FIG. 3. This reduces the space required between the coils 24 and 70 and thus produces a more compact overall package.

The armature 74 is normally held to the bottom of frame 10 by a small magnet 84 (see FIG. 6) which is strong enough to counteract the magnetic attraction due to current flow through coil 70. The armature 74 can, however, be manually pushed toward the coil 70 by a plunger 86 which extends through openings in base plate 12, armature 74, and frame 10. Plunger 86 is normally spring biased away from the armature 74 by spring 88, but manual movement of plunger 86 toward armature 74 is permitted by a substantially cylindrical projection 90 which is formed in housing member 16 opposite the end of plunger 86. When the plunger 86 is pressed upwardly (as viewed in the drawings), it moves the armature 74, which moves the movable contact arm 80 and closes the contacts 82. Then, due to external circuit connections which are not shown in the drawings, the closure of contacts 82 causes a latching current to be passed through coil 70 and the magnetic field due to this current latches the armature 74 and contacts 82 in their closed position until the current flow is interrupted, at which time the armature 74 is moved back to its open position under the urging of spring 76, and the contacts 82 open due to the resiliency of movable contact arm 80.

Figure 2:
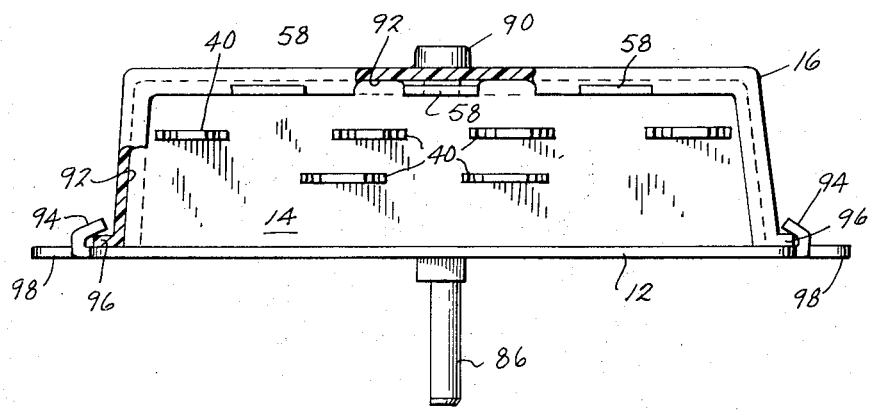
FIG. 2 is a front view of the embodiment shown in FIG. 1 with portions thereof broken away.

Referring to FIG. 2, the housing member 16 is preferably slotted at 92 to fit over the top and sides of terminal strip 14 to help hold it in its proper position. Bendable tabs 94, which project from the sides of base plate 12, are bent over flanges 96 in housing member 16 to hold it and terminal strip 14 in position. As best shown in FIG. 4, the base member 12 preferably has side extensions 98 with openings 100 therein for receiving bolts to hold the relay and push-to-start switch assembly in position in a washing machine, dryer, or similar appliance.

It should be understood that the words "top," "bottom," and "side" are used herein for illustrative purposes only and are not to be considered as limiting. In practice, the switch may be mounted in any desired position and will work as well in any given position. Also, although the invention has been described with reference to one illustrative embodiment thereof, it should be understood that the invention is not limited to that embodiment since many modifications can be made in the disclosed structure without altering its basic principles. For example, although the illustrated embodiment has two relays and push-to-start switch, three or more relays could be used instead if desired. Also, although only two contacts have been disclosed for each relay, three or more contacts could be used if desired. These and many other modifications of the disclosed embodiment will be apparent to those skilled in the art, and this invention includes all such modifications that fall within the scope of the following claims.

What is claimed is:

1. In an electrical device having first and second housing members which cooperate to form an enclosure for the device and one of which members is cup-shaped and formed of electrical insulating material and provided with a marginal edge abutting the other member along a joint line, said other member being a flat metal base plate, a recess in the marginal edge of said cup-shaped member admitting an insulated conductor, a tooth also of electrical insulating material integral with and projecting inwardly from the margin of the recess of said cup-shaped member, and means clamping said two housing members together in assembled relationship, said tooth being of a length to automatically bite into the insulation of the conductor when said two housing members are clamped together with the conductor clamped between the margin of the recess of said cup-shaped housing member and the metal of the flat metal base plate, the tooth of electrical insulating material engaging one side of the conductor and the metal base plate engaging the opposite side.

2. An electrical device as defined in claim 1 in which the recess in the cup-shaped member has the tooth projecting from its upper marginal portion and has opposite sides which are straight and which snugly engage the conductor, whereby the conductor is non-rotatably clamped between the margin of the recess and said flat base plate.

3. An electrical device as claimed in claim 1 in which the means for clamping the two housing members together comprises a bent tab on the metal base plate engaging a marginal portion of the cup-shaped member, the tooth being of a length to automatically bite into the insulation of the conductor when the tab is in bent condition maintaining the housing parts in assembled relationship.

4. An electrical device as claimed in claim 3 in which the means on the cup-shaped housing member which is engaged by said bent tab is an outwardly-directed flange having an outer edge, and in which the tab is bent around and over said outer edge of the flange.

5. An electrical device as claimed in claim 4 in which there is a boss depending from the outwardly-directed flange of the cup-shaped member and in which the flat metal plate has an opening receiving said boss, and in which the bent tab engages said flange to maintain the boss in engagement with said opening while it is also clamping the conductor in position.

* * * * *